S. S. SWANSON.
FEEDING MECHANISM FOR FERTILIZER DISTRIBUTERS.
APPLICATION FILED SEPT. 20, 1917.
1,270,071.
Patented June 18, 1918.
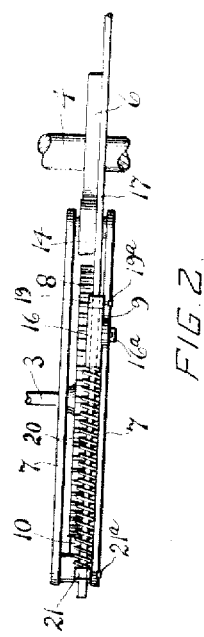
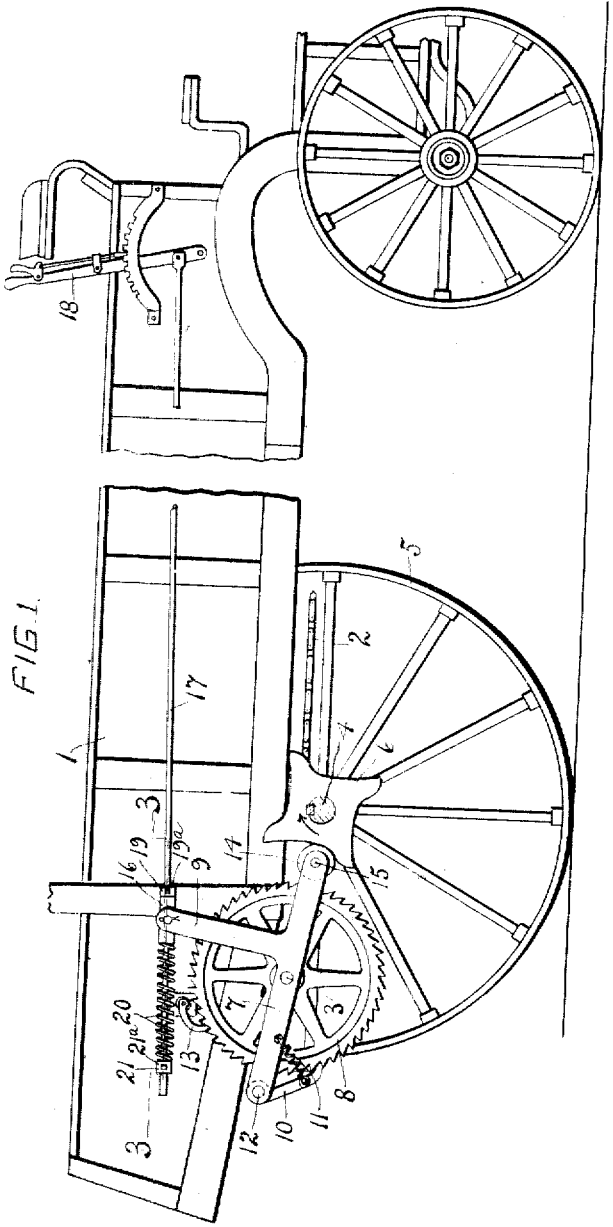
S. S. Swanson, Inventor
By Obed B. Billman, Attorney

UNITED STATES PATENT OFFICE.

STARLEY S. SWANSON, OF BELLEVUE, OHIO.

FEEDING MECHANISM FOR FERTILIZER-DISTRIBUTERS.

1,270,071.　　　　　Specification of Letters Patent.　　Patented June 18, 1918.

Application filed September 20, 1917. Serial No. 192,408.

*To all whom it may concern:*

Be it known that I, STARLEY S. SWANSON, a citizen of the United States, residing at Bellevue, in the county of Huron and State of Ohio, have invented certain new and useful Improvements in Feeding Mechanism for Fertilizer-Distributers, of which the following is a specification.

My invention relates to improvements in feeding mechanism for fertilizer distributers or spreaders, and more particularly to mechanism for intermittently actuating the traveling load-carrying element or apron in such distributers or spreaders whereby the load-carrying or conveyer apron will be operated intermittently so as to carry the load at the proper speed to the beaters or distributing cylinders and for predeterminately varying the speed at which the conveyer apron travels, and thereby varying the quantity of material distributed.

The primary object of the invention is to provide generally improved mechanism of this class which will be exceedingly simple in construction, cheap of manufacture, and efficient in use.

The invention resides, primarily, in combining with an endless load-carrying apron and means for movably supporting and actuating the same, of means for controlling such actuating means at all times, whereby the operation and rate of travel of the apron may be instantly and conveniently changed to cause the apron to deliver any predetermined quantity of material to the distributing cylinders within a given time.

A still further object of the invention is to provide novel means whereby the feeding mechanism may be thrown out of action when desired without stopping the operation of the distributing cylinders or beaters, as well as providing means whereby the parts may be readily adjusted to compensate for wear.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a side elevation of improved feeding mechanism constructed in accordance with this invention as applied to a conventional form of fertilizer distributer or spreader vehicle, one of the driving wheels being removed for the purpose of clearer illustration of the parts.

Fig. 2, a top plan view of the same, detached.

Fig. 3, an enlarged longitudinal sectional view taken on line 3—3 of Fig. 1, the subjacent ratchet wheel and its intermittent actuating mechanism being removed.

Similar numerals of reference designate like parts throughout all the figures of the drawings.

In Fig. 1, of the drawings the improved feeding mechanism is shown applied to the wagon body or bed 1, of a spreader vehicle and in which the fertilizer is loaded and through which it is fed to the beaters or distributing cylinders, through the medium of the conveyer apron 2, passing over and receiving its motion from the conveyer shaft 3.

The axle shaft 4, may be connected to and driven in the usual manner by means of the ground or driving wheels 5, (one of which is removed) and the shaft 4, is provided with a continuously rotating driving element 6, in the present instance, in the specific form of a cam wheel adapted to intermittently engage and actuate the oscillatory feeding element or rocker of the ratchet mechanism hereinafter described.

As a means of driving or actuating the conveyer shaft 3, the latter is provided with a ratchet wheel 8, and as a means of intermittently actuating or driving the latter an oscillatory feeding element or rocker 7, is mounted on the conveyer shaft 3, said rocker element 7, in the present instance, comprising oppositely disposed members 7, (see Fig. 2), arranged on the inner and outer sides of the ratchet wheel, the outer member of the rocker being provided with an upwardly extending arm 9.

The rear end of the oscillatory element or rocker 7, is provided with a depending pawl 10, adapted to coöperate with the teeth in the ratchet wheel and held in contact therewith at all times by means of the spring 11, said pawl 10, in the present instance, being pivotally mounted on a pivot pin 12, connecting the rear ends of the two members of the rocker 7.

As a means of preventing any retrograde movement of the ratchet wheel 8, and the shaft and conveyer to which it is attached, a gravity operated pawl 13, may be mounted above the ratchet wheel 8, and secured to the vehicle body 1, as shown.

The forward end of the rocker is preferably provided with a friction roller 14, mounted, in the present instance, on an axle shaft or pin 15, connecting the forward ends of the two members of the rocker 7, and it will be apparent that as the cam wheel or driving element 6, is revolved in the direction of the arrow by the driving wheels 5, the forward end of the rocker will be carried upwardly until the engaged arm or wing of the cam wheel passes clear of the roller 14, after which the rocker will be returned, by the mechanism hereinafter described, for a new working or feeding impulse by the ratchet wheel 8.

As a means of resiliently connecting, actuating and controlling said oscillatory member or rocker 7, relative to the driving element or cam wheel 6, and particularly as a means of returning the rocker or feeding element 7, for a new feeding impulse, as well as limiting the throw of the rocker for regulating the feed movement imparted to the apron, the upper end of the arm 9, of the rocker 7, is connected to a sleeve 16, adapted to reciprocate upon an adjustable rod 17, the latter extending forwardly and being adapted to be reciprocated and held in its respective adjusted position by means of a lever 18, within ready reach of the operator or driver of the vehicle, and operated in a well known and understood manner.

As a means of providing suitable stop mechanism for limiting the return movements of the rocker 7, and consequently limiting the length of the working strokes or impulses imparted to the same by the wings or arms of the cam 6, the adjustable rod 17, is provided with a stop member or collar 19, adjustably secured by means of a set screw 19ª, and as a means of resiliently connecting the adjustable and controlling rod 17, to the rocker 7, through the medium of the sleeve 16, and the bearing stud 16ª, (see Fig. 3), and particularly as the means of resisting the action of the rocker 7, during each working impulse as actuated by the cam 6, and returning the rocker 7, to its initial position as controlled by the adjustable rod 17, and stop 19, a coiled compression spring 20, is mounted on the adjustable rod 17, at the rear of the sleeve 16, and interposed between the latter and a second collar 21, adjustably secured on the adjustable rod 17, by means of a set screw 21ª, the tension of the spring 20, and the action of the latter upon the sleeve 16, and rocker 7, being readily regulated by adjusting the collar 21, in an obvious manner.

When it is desired to throw the feeding mechanism entirely out of action without stopping the operation of the distributing cylinders or beaters the adjustable rod 17, is thrown rearwardly to such point as to carry the forward end of the rocker 7, upwardly a sufficient distance to cause the roller 14, to be held clear of the arms or wings of the cam wheel 6.

From the foregoing description, taken in connection with the accompanying drawings, the operation and advantages of my invention will be readily understood.

Having thus described one of the embodiments of my invention, what I claim and desire to secure by Letters Patent, is,—

1. In feeding mechanism for fertilizers, the combination with rotatable and oscillatory feeding elements; of a continuously rotating driving element intermittently actuating said elements, and longitudinally movable means for resiliently actuating and controlling said oscillatory feeding element relative to and independently of said driving element.

2. In a feeding device for fertilizer distributers, the combination with a shaft provided with a ratchet wheel, and a driving element comprising a cam; of a rocker on said shaft provided at one end with a feed pawl in engagement with said ratchet wheel and at the other with a roller in engagement with said cam, and control mechanism adjustably and resiliently connected to said rocker.

3. In a feeding device for fertilizer distributers, the combination with a shaft provided with a ratchet wheel, and a driving shaft in front of the latter and a cam carried by said shaft; of a rocker on said shaft provided at one end with a feed pawl in engagement with said ratchet wheel and at the other with a roller in engagement with said cam, and control mechanism adjustably and resiliently connected to said rocker, and adapted to carry said roller out of engagement with said cam.

4. A feeding mechanism for fertilizer distributers, comprising a conveyer shaft provided with a ratchet wheel and a driving shaft having a cam, a rocker on said shaft operated by said cam, a pawl on said rocker an adjustable guide rod, a sleeve on the latter in pivoted engagement with said rocker a sleeve stop on said rod, a second adjustable stop on said rod, and a spring carried by said adjustable guide member between said sleeve and adjustable stops for resisting and returning the latter and said rocker as actuated by said shaft and cam.

5. A feeding mechanism for fertilizer distributers, comprising a conveyer shaft, ratchet wheel thereon, a driving shaft provided with a cam, a rocker on said shaft provided at one end with a feed pawl and at the other with a friction roller adapted to be engaged by said cam, said rocker being provided with an arm, a sleeve carried b the latter, an adjustable rod in said sleeve and provided with a stop member for limiting the movement of said sleeve and rocker, and a spring on said rod for resisting the movements of said sleeve and rocker, and returning the latter when actuated by said cam and driving shaft.

In testimony whereof I have affixed my signature in the presence of two witnesses.

STARLEY S. SWANSON

Witnesses:
B. B. HATHAWAY,
D. SALTZER.